United States Patent
Lee et al.

(10) Patent No.: US 9,834,623 B1
(45) Date of Patent: Dec. 5, 2017

(54) CROSSLINKED COPOLYMER AND IONIC EXCHANGE FILM

(71) Applicant: INDUSTRIAL TECHNOLOGY RESEARCH INSTITUTE, Hsinchu (TW)

(72) Inventors: Hsuan-Wei Lee, Zhudong Township (TW); Li-Duan Tsai, Hsinchu (TW); Chiu-Hun Su, Hsinchu (TW); Chiu-Tung Wang, Tianwei Township (TW); Cheng-Hsiu Tsai, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 15/388,664

(22) Filed: Dec. 22, 2016

(30) Foreign Application Priority Data

Nov. 15, 2016 (TW) .............................. 105137204 A

(51) Int. Cl.
*C08F 22/36* (2006.01)
*C08F 26/06* (2006.01)
(Continued)

(52) U.S. Cl.
CPC ............... *C08F 8/32* (2013.01); *B01D 71/06* (2013.01); *C02F 1/42* (2013.01); *C08J 5/2243* (2013.01);
(Continued)

(58) Field of Classification Search
CPC ....... C08F 8/32; B01D 71/06; B01D 2325/42; B01D 2323/30; C02F 1/42;
(Continued)

(56) References Cited

U.S. PATENT DOCUMENTS 5,648,405 A   7/1997   Ma et al.
8,329,622 B2  12/2012  Crossman et al.
(Continued)

FOREIGN PATENT DOCUMENTS

CN    102020820 A    4/2011
CN    102049202 A    5/2011
(Continued)

OTHER PUBLICATIONS

EIC Structure Search Sep. 7, 2017.*
(Continued)

*Primary Examiner* — Pamela H Weiss
(74) *Attorney, Agent, or Firm* — Birch, Stewart, Kolasch & Birch, LLP

(57) ABSTRACT

A crosslinked copolymer is provided, which includes a copolymer crosslinked by a crosslinking agent. The copolymer is copolymerized of (a) styrene-based monomer, (b) monomer having conjugated double bonds or acrylate ester monomer, and (c) ammonium-containing heterocyclic monomer. The crosslinking agent is (d)

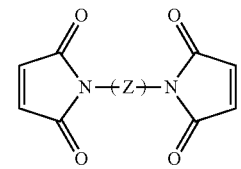

or the product of the reaction between

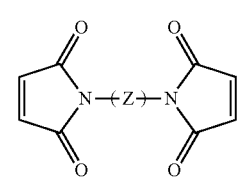

and (e)

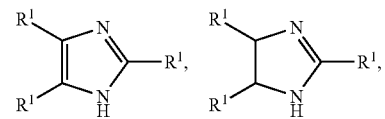

or a combination thereof. Z is

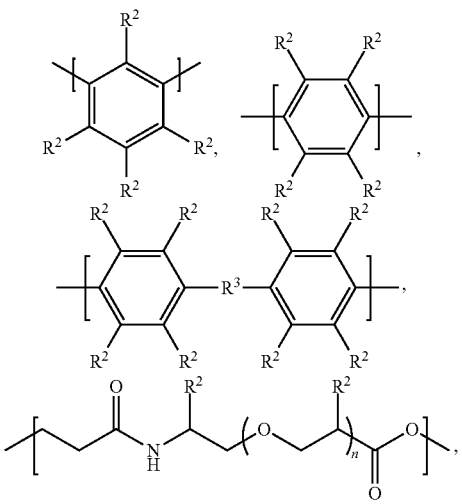

(Continued)

-continued

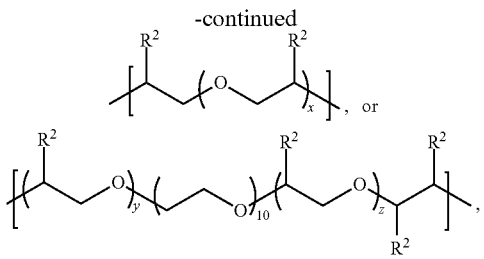

wherein each $R^1$ is independently H or $C_{1-4}$ alkyl group, each $R^2$ is independently H or $C_{1-4}$ alkyl group, $R^3$ is single bond, —O—, —S—, —CH$_2$—, or —NH—. n is a positive integer. x is 1 to 12, y is 1 to 5, and z is 1 to 5.

10 Claims, No Drawings

(51) Int. Cl.
 C02F 1/42 (2006.01)
 C08F 8/32 (2006.01)
 C08J 5/22 (2006.01)
 B01D 71/06 (2006.01)
(52) U.S. Cl.
 CPC ...... B01D 2323/30 (2013.01); B01D 2325/42 (2013.01); C02F 2001/422 (2013.01); C08J 2325/08 (2013.01); C08J 2325/18 (2013.01)
(58) Field of Classification Search
 CPC ............... C02F 2001/422; C08J 5/2243; C08J 2325/18; C08J 2325/08
 See application file for complete search history.

(56) References Cited

U.S. PATENT DOCUMENTS

| | | |
|---|---|---|
| 8,449,652 B2 | 5/2013 | Radosz et al. |
| 8,759,451 B2 | 6/2014 | Mruk et al. |
| 2008/0296305 A1 | 12/2008 | Wyse et al. |
| 2011/0213099 A1 | 9/2011 | Patil et al. |
| 2012/0035283 A9 | 2/2012 | Xu et al. |
| 2012/0041138 A1 | 2/2012 | Ma |
| 2014/0197032 A1 | 7/2014 | Willis et al. |
| 2014/0343177 A1 | 11/2014 | Willis et al. |
| 2016/0177006 A1 * | 6/2016 | Sano ............ C08F 212/14 521/27 |

FOREIGN PATENT DOCUMENTS

| | | | |
|---|---|---|---|
| CN | 102127196 A | | 7/2011 |
| CN | 102206386 A | | 10/2011 |
| CN | 104371124 A | * | 2/2015 |
| CN | 105061703 A | | 11/2015 |
| CN | 105273204 A | | 1/2016 |
| CN | 10542508 A | | 4/2016 |
| CN | 105903357 A | | 8/2016 |
| JP | 59-161410 A | | 9/1984 |
| TW | I374923 B | | 10/2012 |
| TW | I516513 B | | 1/2016 |
| TW | 201609836 A | | 3/2016 |
| WO | WO 2015030070 A1 * | | 3/2015 ............ C08F 212/14 |

OTHER PUBLICATIONS

Li et al., "Novel Anion Exchange Membranes Based on Polymerizable Imidazolium Salt for Alkaline Fuel Cell Applications," Journal of Materials Chemistry, vol. 21, 2011 (published online Jun. 23, 2011), pp. 11340-11346.
Lin et al., "Alkaline Stable C2-Substituted Imidazolium-Based Anion-Exchange Membranes," Chemistry of Materials, vol. 25, 2013 (first published Mar. 27, 2013), pp. 1858-1867.
Moraes et al., "The Synthesis of Well-Defined Poly(Vinylbenzyl Chloride)-Grafted Nanoparticles via Raft Polymerization," Beilstein Journal of Organic Chemistry, vol. 9, Jun. 25, 2013, pp. 1226-1234.
Park et al., "Synthesis and Characteristics of Aminated Vinylbenzyl Chloride-co-Styrene-co-Hydroxylethyl Acrylate Anion-Exchange Membrane for Redox Flow Battery Applications," Journal of Membrane Science, vol. 423-424, 2012 (published online Aug. 31, 2012), pp. 429-437.
Price et al., "Bicontinuous Alkaline Fuel Cell Membranes from Strongly Self-Segregating Block Copolymers," Macromolecules, vol. 46, 2013 (first published Aug. 30, 2013), pp. 7332-7340.
Vandiver et al., "Mechanical Performance of Polyisoprene Copolymer Anion Exchange Membranes by Varying Crosslinking Methods," Journal of the Electrochemical Society, vol. 162, No. 4, 2015 (first published Jan. 28, 2015), pp. H206-H212.
Taiwanese Office Action and Search Report, dated Jul. 11, 2017, for corresponding Taiwanese Application No. 105137204.

* cited by examiner

CROSSLINKED COPOLYMER AND IONIC EXCHANGE FILM

CROSS REFERENCE TO RELATED APPLICATIONS

The present application is based on, and claims priority from, Taiwan Application Serial Number 105137204, filed on Nov. 15, 2016, the disclosure of which is hereby incorporated by reference herein in its entirety.

TECHNICAL FIELD

The technical field relates to crosslinked copolymer and an ionic exchange film utilizing the same.

BACKGROUND

In view of green energy, the requirement of treating waste water from livelihood, industry, and agriculture gradually increases over the years. Cationic exchange films are maturely developed and widely utilized in conventional film products. However, there is no conventional anionic exchange film with high ionic conductivity, long lifespan, and high performance to match the cationic exchange film when the cationic and anionic exchange films are simultaneously used. Compared to the cationic exchange film, the commercially available alkaline solid anionic exchange film has an obviously lower ionic conductivity. As such, the utilization of the solid anionic exchange film is greatly limited.

The ionic substances of the solution can be de-salted, condensed, purified, and recycled by the ionic exchange film driven by electricity. The ionic exchange film may further selectively separate the ionic substances, and remove the ionic substances from a non-ionic valuable substance. Accordingly, an appropriate ionic exchange film for water treatment and highly efficient recycling is called for.

SUMMARY

One embodiment of the disclosure provides a crosslinked copolymer comprising a copolymer crosslinked by a crosslinking agent. The copolymer is copolymerized of (a) styrene-based monomer, (b) monomer having conjugated double bonds or acrylate ester monomer, and (c) ammonium-containing heterocyclic monomer.

The crosslinking agent is (d)

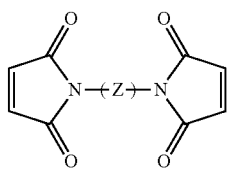

or the product of the reaction between (d)

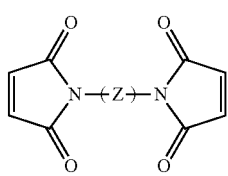

and (e)

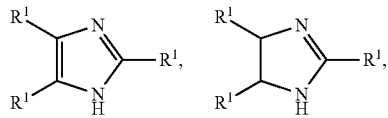

or a combination thereof, wherein Z

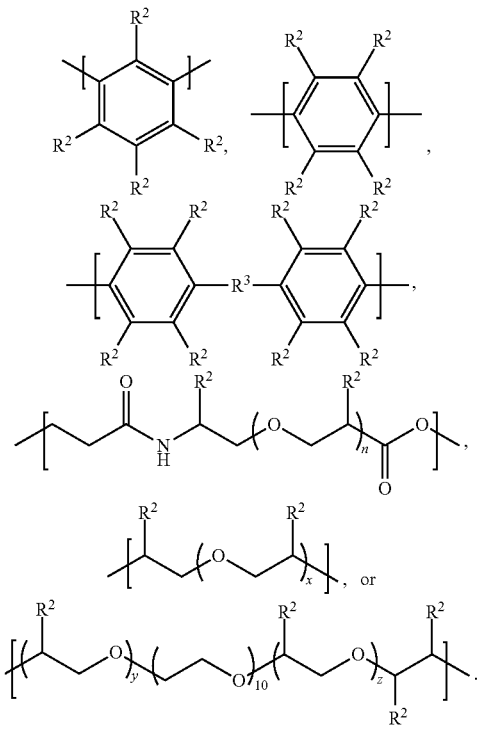

Each $R^1$ is independently H or $C_{1-4}$ alkyl group, each $R^2$ is independently H or $C_{1-4}$ alkyl group, $R^3$ is single bond, —O—, —S—, —CH$_2$—, or —NH—, n is a positive integer, x is 1 to 12, y is 1 to 5, and z is 1 to 5.

One embodiment of the disclosure provides an ionic exchange film, comprising a film of the described crosslinked copolymer, and the film of the crosslinked copolymer has a thickness of 15 micrometers to 200 micrometers.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

In the disclosure, a novel polymer is developed to prepare an anionic exchange film with mechanical strength, chemical stability, low resistivity, and the like for increasing the applicability of the film and reducing the cost of the water treatment system.

One embodiment of the disclosure provides a crosslinked copolymer comprising a copolymer crosslinked by a crosslinking agent. The copolymer is copolymerized of (a) styrene-based monomer, (b) monomer having conjugated double bonds or acrylate ester monomer, and (c) ammonium-containing heterocyclic monomer. The crosslinking agent is (d)

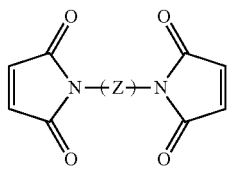

or the product of the reaction between (d)

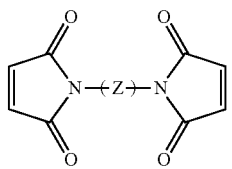

and (e)

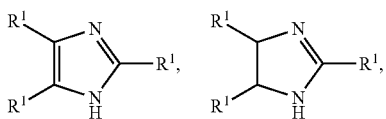

or a combination thereof, wherein Z is

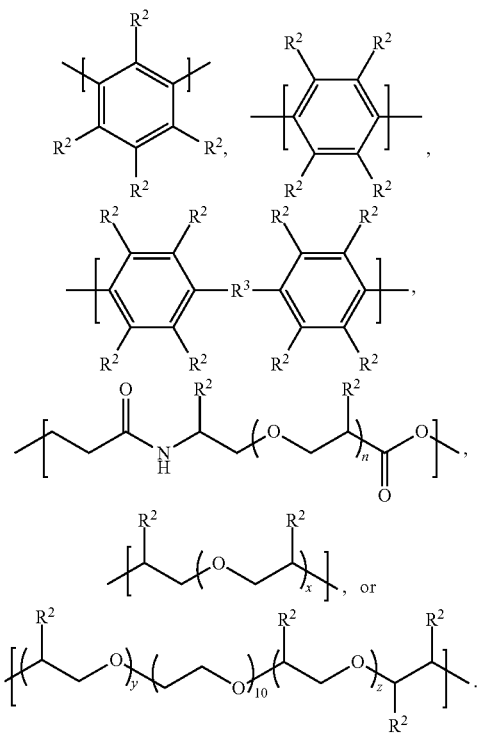

Each $R^1$ is independently H or $C_{1-4}$ alkyl group, each $R^2$ is independently H or $C_{1-4}$ alkyl group, $R^3$ is single bond, —O—, —S—, —CH$_2$—, or —NH—, n is a positive integer, x is 1 to 12, y is 1 to 5, and z is 1 to 5.

In one embodiment, the copolymer and the crosslinking agent have a weight ratio of 6 to 50. The copolymer crosslinked by an overly low ratio of the crosslinking agent cannot form a film, or can form a film but one with low mechanical strength. The copolymer crosslinked by an overly high ratio of the crosslinking agent is easily gelled, which cannot be used to form an ionic exchange film. In one embodiment, the (c) ammonium-containing heterocyclic monomer and (a) styrene-based monomer have a molar ratio of 1:10 to 50:1, and (c) ammonium-containing heterocyclic monomer and (b) monomer having conjugated double bonds or acrylate ester monomer have a molar ratio of 1:10 to 50:1. An overly low ratio of the (c) ammonium-containing heterocyclic monomer means an overly low ionic segment ratio of the copolymer, such that the copolymer cannot be efficiently crosslinked by the crosslinking agent. An overly high ratio of the (c) ammonium-containing heterocyclic monomer means an overly high ionic segment ratio of the copolymer, such that the crosslinked copolymer is easily gelled and cannot be used to form an ionic exchange film. In one embodiment, the copolymer has an ionic segment ratio of 30% to 70%. In one embodiment, the copolymer has a weight average molecular weight of 5000 to 300000. If the copolymer has a too low weight average molecular weight, the film of the crosslinked copolymer will be brittle and easy to crack. If the copolymer has a too high weight average molecular weight, it cannot be completely dissolved in a coating solution, and the crosslinked copolymer will be easily gelled. The weight average molecular weight of the copolymer can be controlled by the polymerization method, polymerization temperature, and polymerization period. For example, the copolymer can be polymerized by reversible addition-fragmentation chain-transfer (RAFT) reaction, in which the RAFT chain-transfer agent can be 4-cyano-4-(phenylcarbonothioylthio) pentanoic acid. Alternatively, the copolymer can be polymerized by radical polymerization, in which the initiator can be azobisisbutyronitrile (AIBN) or another general initiator.

In one embodiment, (a) styrene-based monomer has a chemical structure of

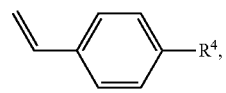

wherein $R^4$ is H, $C_{1-10}$ alkyl group, or $C_{5-6}$ cycloalkyl group. In one embodiment, (b) monomer having conjugated double bonds has a chemical structure of

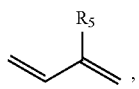

and (b) acrylate ester monomer has a chemical structure of

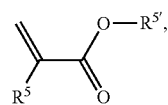

wherein each $R^5$ is independently H, $C_{1-10}$ alkyl group, or $C_{5-6}$ cycloalkyl group, and $R^{5'}$ is independently H, $C_{1-8}$ alkyl group, polyalkylene glycol group, or hydroxyl-containing alkyl group. In one embodiment, (c) ammonium-containing heterocyclic monomer has a chemical structure of

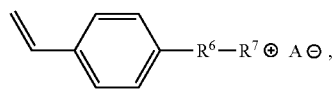

wherein $R^6$ is single bond, or linear or branched $C_{1-10}$ alkylene group, $R^7 \oplus$ is

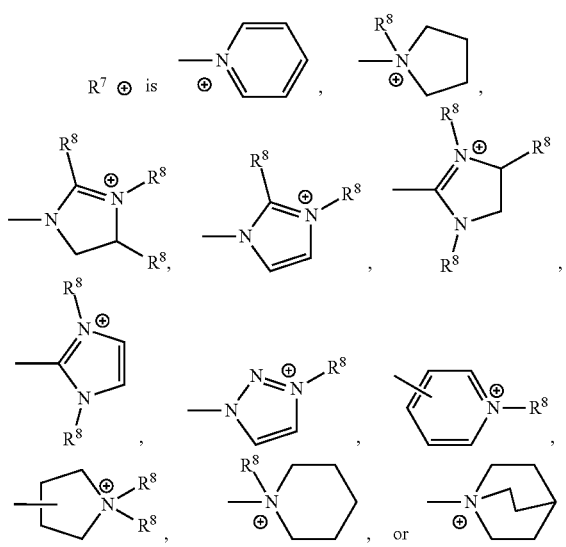

wherein each of $R^8$ is independent H, $C_{1-8}$ alkyl group, ethenyl group, $C_{6-12}$ aromatic group, or allyl group, and wherein $A^-$ is $F^-$, $Cl^-$, $Br^-$, $I^-$, $OH^-$, $HCO_3^-$, $HSO_4^-$, $NH_2^-$, $SbF_6^-$, $BF_4^-$, $H_2PO_4^-$, $HPO_3^-$, or a combination thereof.

In one embodiment, a film of the described crosslinked copolymer may serve as an ionic exchange film, and the film has a thickness of 15 micrometers to 200 micrometers. If the film of the crosslinked copolymer is too thin, it will have low size stability and become broken during use. If the film of the crosslinked copolymer is too thick, it will have a higher resistivity to negatively influence its back-end application. Alternatively, the ionic exchange film may further include a porous supporting film adhered to the film of the crosslinked copolymer, and the crosslinked copolymer may fill into the pores of the porous supporting film, thereby reducing the size change ratio and increasing the yield strength of the ionic exchange film. The porous supporting film can be polytetrafluoroethene (PTFE), polyimide (PI), polyethylene terephthalate (PET), polyether ether ketone (PEEK), polypropylene (PP), polyethylene (PE), polyvinylidene fluoride (PVDF), a blend thereof, or a multi-layered structure thereof. In one embodiment, the porous supporting film can be formed by one-side coating, two-side coating, or dip coating. The porous supporting film may have a thickness of 20 micrometers to 200 micrometers. An overly thick porous supporting film may have an overly high resistivity, which may negatively influence the backend application such as ion-selective filtration.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1 (Preparation of Crosslinking Agent)

2.73 g of N,N'-4,4'-diphenylmethane bismaleimide, 0.37 g of 2.4-dimethyl-imidazole, and 97 g of dimethyl acetamide (DMAc) were put into a reaction bottle with constant stirring until all chemicals were completely dissolved, and then reacted at 150° C. for 5 hours to form a crosslinking agent of polymer type. N,N'-4,4'-diphenylmethane bismaleimide has a chemical structure of

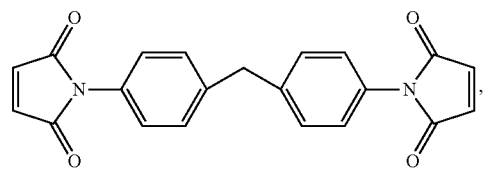 [SMILES: O=C1C=CC(=O)N1c1ccc(Cc2ccc(N3C(=O)C=CC3=O)cc2)cc1]

2.4-dimethyl-imidazole has a chemical structure of

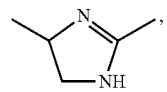

and N,N'-4,4'-diphenylmethane bismaleimide and 2.4-dimethyl-imidazole have a molar ratio of 2:1.

Preparation Example 2

1 part by mole of 4-cyano-4-(thiobenzoylthio)pentanoic acid (commercially available from Stream), 500 parts by mole of 4-vinylbenzoic chloride (VBC), 600 parts by mole of n-butyl acrylate (BA), 900 parts by mole of styrene (St), and 2.5 parts by mole of AIBN were put into a two-neck bottle under nitrogen. Toluene was added into the bottle to dissolve the above mixture, and the solution was heated and kept at 75° C. to react for 24 hours. The resulting product was cooled to room temperature and added into methanol to precipitate solid. The solid was washed to remove residual monomers, and then dried under reduced pressure to obtain a copolymer Poly(VBC-co-BA-co-St)-1.

The copolymer Poly(VBC-co-BA-co-St)-1 (in which the VBC amount served as 1 part by mole), 2.5 parts by mole of 1-methyl imidazole, and 0.005 parts by mole of dibutyl hydroxytoluene were added into a two-neck bottle. Butanol and tetrahydrofuran (THF) were added into the bottle to dissolve the above mixture, and the solution was heated and kept at 77° C. to react for 16 hours. The resulting product was cooled to room temperature and added into ethyl ether to precipitate solid. The solid was washed to remove residual monomers, and then dried under reduced pressure to obtain copolymer (1). The copolymer (1) contained an ionic segment ratio of 25%.

Preparation Example 3

1 part by mole of 4-cyano-4-(thiobenzoylthio)pentanoic acid, 700 parts by mole of VBC, 500 parts by mole of BA, 800 parts by mole of St, and 2.5 parts by mole of AIBN were put into a two-neck bottle under nitrogen. Toluene was added into the bottle to dissolve the above mixture, and the solution was heated and kept at 75° C. to react for 24 hours. The resulting product was cooled to room temperature and added into methanol to precipitate solid. The solid was washed to remove residual monomers, and then dried under reduced pressure to obtain a copolymer Poly(VBC-co-BA-co-St)-2.

The copolymer Poly(VBC-co-BA-co-St)-2 (in which the VBC amount served as 1 part by mole), 2.5 parts by mole of 1-methyl imidazole, and 0.005 parts by mole of dibutyl hydroxytoluene were added into a two-neck bottle. Butanol and THF were added into the bottle to dissolve the above mixture, and the solution was heated and kept at 77° C. to react for 16 hours. The resulting product was cooled to room temperature and added into ethyl ether to precipitate solid. The solid was washed to remove residual monomers, and then dried under reduced pressure to obtain copolymer (2). The copolymer (2) contained an ionic segment ratio of 35%.

Preparation Example 4

1 part by mole of 4-cyano-4-(thiobenzoylthio)pentanoic acid, 1200 parts by mole of VBC, 500 parts by mole of BA, 300 parts by mole of St, and 2.5 parts by mole of AIBN were put into a two-neck bottle under nitrogen. Toluene was added into the bottle to dissolve the above mixture, and the solution was heated and kept at 75° C. to react for 24 hours. The resulting product was cooled to room temperature and added into methanol to precipitate solid. The solid was washed to remove residual monomers, and then dried under reduced pressure to obtain a copolymer Poly(VBC-co-BA-co-St)-3.

The copolymer Poly(VBC-co-BA-co-St)-3 (in which the VBC amount served as 1 part by mole), 2.5 parts by mole of 1-methyl imidazole, and 0.005 parts by mole of dibutyl hydroxytoluene were added into a two-neck bottle. Butanol and THF were added into the bottle to dissolve the above mixture, and the solution was heated and kept at 77° C. to react for 16 hours. The resulting product was cooled to room temperature and added into ethyl ether to precipitate solid. The solid was washed to remove residual monomers, and then dried under reduced pressure to obtain copolymer (3). The copolymer (3) contained an ionic segment ratio of 60%.

Preparation Example 5

1 part by mole of 4-cyano-4-(thiobenzoylthio)pentanoic acid, 1400 parts by mole of VBC, 400 parts by mole of BA, 200 parts by mole of St, and 2.5 parts by mole of AIBN were put into a two-neck bottle under nitrogen. Toluene was added into the bottle to dissolve the above mixture, and the solution was heated and kept at 75° C. to react for 24 hours. The resulting product was cooled to room temperature and added into methanol to precipitate solid. The solid was washed to remove residual monomers, and then dried under reduced pressure to obtain a copolymer Poly(VBC-co-BA-co-St)-4.

The copolymer Poly(VBC-co-BA-co-St)-4 (in which the VBC amount served as 1 part by mole), 2.5 parts by mole of 1-methyl imidazole, and 0.005 parts by mole of dibutyl hydroxytoluene were added into a two-neck bottle. Butanol and THF were added into the bottle to dissolve the above mixture, and the solution was heated and kept at 77° C. to react for 16 hours. The resulting product was cooled to room temperature and added into ethyl ether to precipitate solid. The solid was washed to remove residual monomers, and then dried under reduced pressure to obtain copolymer (4). The copolymer (4) contained an ionic segment ratio of 70%.

Preparation Example 6

1 part by mole of 4-cyano-4-(thiobenzoylthio)pentanoic acid, 1600 parts by mole of VBC, 300 parts by mole of BA, 100 parts by mole of St, and 2.5 parts by mole of AIBN were put into a two-neck bottle under nitrogen. Toluene was added into the bottle to dissolve the above mixture, and the solution was heated and kept at 75° C. to react for 24 hours. The resulting product was cooled to room temperature and added into methanol to precipitate solid. The solid was washed to remove residual monomers, and then dried under reduced pressure to obtain a copolymer Poly(VBC-co-BA-co-St)-5.

The copolymer Poly(VBC-co-BA-co-St)-5 (in which the VBC amount served as 1 part by mole), 2.5 parts by mole of 1-methyl imidazole, and 0.005 parts by mole of dibutyl hydroxytoluene were added into a two-neck bottle. Butanol and THF were added into the bottle to dissolve the above mixture, and the solution was heated and kept at 77° C. to react for 16 hours. The resulting product was cooled to room temperature and added into ethyl ether to precipitate solid. The solid was washed to remove residual monomers, and then dried under reduced pressure to obtain copolymer (5). The copolymer (5) contained an ionic segment ratio of 80%.

Preparation Example 7

The copolymer Poly(VBC-co-BA-co-St)-2 (in which the VBC amount served as 1 part by mole), 2.5 parts by mole of 1-butyl imidazole, and 0.005 parts by mole of dibutyl hydroxytoluene were added into a two-neck bottle. Butanol and THF were added into the bottle to dissolve the above mixture, and the solution was heated and kept at 77° C. to react for 16 hours. The resulting product was cooled to room temperature and added into ethyl ether to precipitate solid. The solid was washed to remove residual monomers, and then dried under reduced pressure to obtain copolymer (6). The copolymer (6) contained an ionic segment ratio of 35%.

Preparation Example 8

The copolymer Poly(VBC-co-BA-co-St)-2 (in which the VBC amount served as 1 part by mole), 2.5 parts by mole of 1-methyl piperidine, and 0.005 parts by mole of dibutyl hydroxytoluene were added into a two-neck bottle. Butanol and THF were added into the bottle to dissolve the above mixture, and the solution was heated and kept at 77° C. to react for 16 hours. The resulting product was cooled to room temperature and added into ethyl ether to precipitate solid. The solid was washed to remove residual monomers, and then dried under reduced pressure to obtain copolymer (7). The copolymer (7) contained an ionic segment ratio of 35%.

Preparation Example 9

The copolymer Poly(VBC-co-BA-co-St)-2 (in which the VBC amount served as 1 part by mole), 2.5 parts by mole of 1,4-Diazabicyclo[2.2.2]octane (DABCO), and 0.005 parts by mole of dibutyl hydroxytoluene were added into a two-neck bottle. Butanol and THF were added into the bottle to dissolve the above mixture, and the solution was heated and kept at 77° C. to react for 16 hours. The resulting product was cooled to room temperature and added into ethyl ether to precipitate solid. The solid was washed to remove residual monomers, and then dried under reduced pressure to obtain copolymer (8). The copolymer (8) contained an ionic segment ratio of 35%.

Preparation Example 10

The copolymer Poly(VBC-co-BA-co-St)-2 (in which the VBC amount served as 1 part by mole), 1.3 parts by mole of 1-methyl piperidine, 1.3 parts by mole of 1-methyl imidazole, and 0.005 parts by mole of dibutyl hydroxytoluene were added into a two-neck bottle. Butanol and THF were added into the bottle to dissolve the above mixture, and the solution was heated and kept at 77° C. to react for 16 hours. The resulting product was cooled to room temperature and added into ethyl ether to precipitate solid. The solid was washed to remove residual monomers, and then dried under reduced pressure to obtain copolymer (9). The copolymer (9) contained an ionic segment ratio of 35%.

Preparation Example 11

1 part by mole of 4-cyano-4-(thiobenzoylthio)pentanoic acid, 700 parts by mole of VBC, 400 parts by mole of poly(ethylene glycol) methacrylate (PEGMA, Mn=480), 700 parts by mole of St, and 2.5 parts by mole of AIBN were put into a two-neck bottle under nitrogen. Toluene was added into the bottle to dissolve the above mixture, and the solution was heated and kept at 75° C. to react for 24 hours. The resulting product was cooled to room temperature and added into methanol to precipitate solid. The solid was washed to remove residual monomers, and then dried under reduced pressure to obtain a copolymer Poly(VBC-co-PEGMA-co-St).

The copolymer Poly(VBC-co-PEGMA-co-St) (in which the VBC amount served as 1 part by mole), 2.5 parts by mole of 1-methyl imidazole, and 0.005 parts by mole of dibutyl hydroxytoluene were added into a two-neck bottle. Butanol and THF were added into the bottle to dissolve the above mixture, and the solution was heated and kept at 77° C. to react for 16 hours. The resulting product was cooled to room temperature and added into ethyl ether to precipitate solid. The solid was washed to remove residual monomers, and then dried under reduced pressure to obtain copolymer (10). The copolymer (10) contained an ionic segment ratio of 40%.

Preparation Example 12

1 part by mole of 4-cyano-4-(thiobenzoylthio)pentanoic acid, 600 parts by mole of VBC, 700 parts by mole of isoprene (Isp), 300 parts by mole of St, and 2.5 parts by mole of AIBN were put into a two-neck bottle under nitrogen. Toluene was added into the bottle to dissolve the above mixture, and the solution was heated and kept at 110° C. to react for 36 hours. The resulting product was cooled to room temperature and added into methanol to precipitate solid. The solid was washed to remove residual monomers, and then dried under reduced pressure to obtain a copolymer Poly(VBC-co-Isp-co-St)-1.

The copolymer Poly(VBC-co-Isp-co-St)-1 (in which the VBC amount served as 1 part by mole), 2.5 parts by mole of 1-methyl piperidine, 2.5 parts by mole of 1-methyl imidazole, and 0.005 parts by mole of dibutyl hydroxytoluene were added into a two-neck bottle. Butanol and THF were added into the bottle to dissolve the above mixture, and the solution was heated and kept at 80° C. to react for 16 hours. The resulting product was cooled to room temperature and added into ethyl ether to precipitate solid. The solid was washed to remove residual monomers, and then dried under reduced pressure to obtain copolymer (11). The copolymer (11) contained an ionic segment ratio of 40%.

Preparation Example 13

The copolymer Poly(VBC-co-BA-co-St)-2 (in which the VBC amount served as 1 part by mole), 2.5 parts by mole of 1,2-dimethyl imidazole, and 0.005 parts by mole of dibutyl hydroxytoluene were added into a two-neck bottle. Butanol and THF were added into the bottle to dissolve the above mixture, and the solution was heated and kept at 77° C. to react for 16 hours. The resulting product was cooled to room temperature and added into ethyl ether to precipitate solid. The solid was washed to remove residual monomers, and then dried under reduced pressure to obtain copolymer (12). The copolymer (12) contained an ionic segment ratio of 35%.

Preparation Example 14

1 part by mole of 4-cyano-4-(thiobenzoylthio)pentanoic acid, 600 parts by mole of VBC, 1100 parts by mole of St, and 2.5 parts by mole of AIBN were put into a two-neck bottle under nitrogen. Toluene was added into the bottle to dissolve the above mixture, and the solution was heated and kept at 75° C. to react for 24 hours. The resulting product was cooled to room temperature and added into methanol to precipitate solid. The solid was washed to remove residual monomers, and then dried under reduced pressure to obtain a copolymer Poly(VBC-co-St).

The copolymer Poly(VBC-co-St) (in which the VBC amount served as 1 part by mole), 2.5 parts by mole of 1-methyl imidazole, and 0.005 parts by mole of dibutyl hydroxytoluene were added into a two-neck bottle. Butanol and THF were added into the bottle to dissolve the above mixture, and the solution was heated and kept at 80° C. to react for 16 hours. The resulting product was cooled to room temperature and added into ethyl ether to precipitate solid. The solid was washed to remove residual monomers, and then dried under reduced pressure to obtain copolymer (13). The copolymer (13) contained an ionic segment ratio of 35%.

Comparative Example 1

As shown in China Patent No. CN102206386B, the polymer including acrylate and ammonium-containing heterocyclic ring has a conductivity of 0.015 S/cm.

Comparative Example 2

100 parts by weight of copolymer (13) was added into a reaction bottle and then dissolved by 567 parts by weight of dimethyl sulfoxide (DMSO). 3 parts by weight of the crosslinking agent of polymer type was then added into the reaction bottle. The mixture was dispersed with a high-speed homogenizer and then de-bubbled to form a solution. The solution was spin coated on a glass substrate to form a coating. The coating was then baked at 150° C. to remove most of the solvent, and then baked at 180° C. for 2 hours to remove the residual solvent. As such, an anionic exchange film was obtained. Because the anionic exchange film had insufficient strength (e.g. brittle and easy to crack), it could not be used and its properties could not be measured, as shown in Table 1.

Example 1

100 parts by weight of copolymer (1) was added into a reaction bottle and then dissolved by 567 parts by weight of DMSO. The solution was spin-coated on a glass substrate to form a coating. The coating was then baked at 150° C. to remove most of the solvent, and then baked at 180° C. for 3 hours to remove the residual solvent. As such, an anionic exchange film (1) was obtained to measure its ionic conductivity, size change ratio, and yield strength, as shown in Table 1.

The ionic conductivity of the film was measured in the following steps: 1. The film was washed by alkaline solution and water. 2. The thickness of the film was measured. 3. The film was put into a fixture for measuring its conductivity. 4. The scanning range of the measurement was 7 MHz to 100 MHz. 5. The test temperature of the measurement was room temperature. The conductivity of the film was calculated from the resistivity and the thickness of the film.

The size change ratio of the film was measured in the following steps: 1. The dry film was cut to a specific area, and the length and the width of the cut film were recorded. 2. The dry film was soaked in de-ionized water at room temperature for 24 hours. 3. The water on the surface of the wet film was removed, and the length and width of the wet film were then recorded. 4. The recorded data (e.g. the length and width of the dry film and the wet film) was calculated to obtain the size change ratio (e.g. the swelling ratio).

The yield strength of the film was measured in the following steps: 1. The dry film was cut to a specific volume, and the length, the width, and the thickness of the cut film were recorded in a computer. 2. The cut film was put into a fixture for measuring its yield strength. 3. The film was kept at 30° C. for 1 minute. 4. The film was stretched by a force (gradually increased by 3 newton per minute) until it was broken or stretched by a force of 18 newton to survey its yield strength.

Example 2

100 parts by weight of copolymer (2) was added into a reaction bottle and then dissolved by 567 parts by weight of DMSO. The solution was spin coated on a glass substrate to form a coating. The coating was then baked at 150° C. to remove most of the solvent, and then baked at 180° C. for 3 hours to remove the residual solvent. As such, an anionic exchange film (2) was obtained to measure its ionic conductivity, size change ratio, and yield strength by the described methods, as shown in Table 1.

Example 3

100 parts by weight of copolymer (2) was added into a reaction bottle and then dissolved by 567 parts by weight of DMSO. 3 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (3) was obtained to measure its ionic conductivity, size change ratio, and yield strength by the described methods, as shown in Table 1.

Example 4

100 parts by weight of copolymer (3) was added into a reaction bottle and then dissolved by 567 parts by weight of DMSO. The solution was spin-coated on a glass substrate to form a coating. The coating was then baked at 150° C. to remove most of the solvent, and then baked at 180° C. for 3 hours to remove the residual solvent. As such, an anionic exchange film (4) was obtained. Because the anionic exchange film (4) had poor mechanical properties, it could not be used for its properties measurements, as shown in Table 1.

Example 5

100 parts by weight of copolymer (3) was added into a reaction bottle and then dissolved by 567 parts by weight of DMSO. 3 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (5) was obtained to measure its ionic conductivity, size change ratio, and yield strength by the described methods, as shown in Table 1.

Example 6

100 parts by weight of copolymer (3) was added into a reaction bottle and then dissolved by 567 parts by weight of DMSO. 10 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (6) was obtained to measure its ionic conductivity, size change ratio, and yield strength by the described methods, as shown in Table 1.

Example 7

100 parts by weight of copolymer (4) was added into a reaction bottle and then dissolved by 567 parts by weight of DMSO. 10 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (7) was obtained to measure its ionic conductivity, size change ratio, and yield strength by the described methods, as shown in Table 1.

Example 8

100 parts by weight of copolymer (5) was added into a reaction bottle and then dissolved by 567 parts by weight of DMSO. 10 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (8) was obtained to measure its ionic conductivity, size change ratio, and yield strength by the described methods, as shown in Table 1.

Example 9

100 parts by weight of copolymer (5) was added into a reaction bottle and then dissolved by 567 parts by weight of DMSO. 15 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (9) was obtained. Because the anionic exchange film (9) had poor mechanical properties, it could not be used for its properties measurements, as shown in Table 1.

strength. However, the crosslinking agent could be added to enhance the yield strength of the film. The copolymer with the high ionic segment ratio (e.g. anionic exchange film (5)) could not form a film if the amount of crosslinking agent was insufficient. The copolymer with the high ionic segment ratio could form the film (e.g. anionic exchange film (6)) if the amount of crosslinking agent was higher.

Example 10

100 parts by weight of copolymer (6) was added into a reaction bottle and then dissolved by 567 parts by weight of DMSO. 3 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (10) was obtained to measure its ionic conductivity, size change ratio, and yield strength by the described methods, as shown in Table 2.

TABLE 1

| Anionic exchange film | Copolymer | Ionic segment ratio (%) | Crosslinking agent ratio (%) | Conductivity (S/cm) | Size change ratio (%) | Yield strength (MPa) |
| --- | --- | --- | --- | --- | --- | --- |
| Comparative Example 1 | CN102206386B | 25 | None | 0.015 | — | — |
| Comparative Example 2 | Copolymer (13) | 35 | 3 | Could not form a film | | |
| (1) | Copolymer (1) | 25 | None | 0.016 | 105.1 | 15.7 |
| (2) | Copolymer (2) | 35 | None | 0.028 | 136.7 | 12.1 |
| (3) | Copolymer (2) | 35 | 3 | 0.027 | 112.8 | 20.3 |
| (4) | Copolymer (3) | 60 | None | Could not form a film | | |
| (5) | Copolymer (3) | 60 | 3 | Could not form a film | | |
| (6) | Copolymer (3) | 60 | 10 | 0.059 | 207.3 | 13.8 |
| (7) | Copolymer (4) | 70 | 10 | 0.068 | 265.4 | 8.31 |
| (8) | Copolymer (5) | 80 | 10 | Could not form a film | | |
| (9) | Copolymer (5) | 80 | 15 | Could not form a film | | |

As shown in Table 1, when the copolymer contained a low ionic segment ratio, it could form a film of the copolymer without the crosslinking agent. However, these films without the crosslinking agent had poor conductivity. When the copolymer contained an ionic segment ratio of 35%, the films with the crosslinking agent had a better size change ratio and yield strength. The film of the copolymer in Comparative Example 1 (including acrylate and ammonium-containing heterocyclic ring) had poor conductivity. The film of the copolymer in Comparative Example 2 (including styrene and ammonium-containing heterocyclic ring) was too brittle to be used. The amount of crosslinking agent was increased in conjunction with the increase in the ionic segment ratio of the copolymer. When the copolymer had an ionic segment ratio of 80%, however, the film with 10% crosslinking agent had poor mechanical properties and could not be used. On the other hand, the solution of the copolymer crosslinked by 15% crosslinking agent was easily gelled and could not form a film. The anionic exchange film (1) without crosslinking agent formed a film, but its application effect was poor due to its low conductivity. The anionic exchange film (2) without crosslinking agent formed a film, but its application effect was poor due to its low Example 11

100 parts by weight of copolymer (7) was added into a reaction bottle and then dissolved by 567 parts by weight of DMSO. 3 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (11) was obtained. Because the anionic exchange film (11) had poor mechanical properties, it could not be used for its properties measurements, as shown in Table 2.

Example 12

100 parts by weight of copolymer (8) was added into a reaction bottle and then dissolved by 567 parts by weight of DMSO. 3 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (12) was obtained. Because the anionic exchange film (12) had poor mechanical properties, it could not be used for its properties measurements, as shown in Table 2.

Example 13

100 parts by weight of copolymer (9) was added into a reaction bottle and then dissolved by 567 parts by weight of DMSO. 3 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (13) was obtained to measure its ionic conductivity, size change ratio, and yield strength by the described methods, as shown in Table 2.

Example 14

100 parts by weight of copolymer (12) was added into a reaction bottle and then dissolved by 567 parts by weight of DMSO. 3 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (14) was obtained to measure its ionic conductivity, size change ratio, and yield strength by the described methods, as shown in Table 2.

TABLE 2

| Anionic exchange film | Copolymer | Ionic segment ratio (%) | Cross-linking agent ratio (%) | Conductivity (S/cm) | Size change ratio (%) | Yield strength (MPa) |
|---|---|---|---|---|---|---|
| (3) | Copolymer (2) | 35 | 3 | 0.027 | 112.8 | 20.3 |
| (10) | Copolymer (6) | 35 | 3 | 0.024 | 95.7 | 18.6 |
| (11) | Copolymer (7) | 35 | 3 | Could not form a film | | |
| (12) | Copolymer (8) | 35 | 3 | Could not form a film | | |
| (13) | Copolymer (9) | 35 | 3 | 0.023 | 85.4 | 9.56 |
| (14) | Copolymer (12) | 35 | 3 | 0.031 | 52.7 | 21.4 |

As shown in Table 2, if the copolymer included the ammonium-containing heterocyclic ring without a double bond, the copolymer could not react with the crosslinking agent. Even if the mixture of the copolymer and the crosslinking agent could form a film, the film could not be used and its properties could not be measured due to its insufficient strength. If the copolymer contained the ammonium-containing heterocyclic ring with a double bond, the copolymer may react with the crosslinking agent to increase the solution viscosity and the film strength. The copolymer of the anionic exchange film (13) included some ammonium-containing heterocyclic ring with a double bond, thereby being applicable.

Example 15

100 parts by weight of copolymer (10) was added into a reaction bottle and then dissolved by 567 parts by weight of DMSO. 5 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (15) was obtained to measure its ionic conductivity, size change ratio, and yield strength by the described methods, as shown in Table 3.

Example 16

100 parts by weight of copolymer (11) was added into a reaction bottle and then dissolved by 567 parts by weight of DMSO. 5 parts by weight of the crosslinking agent of polymer type was then added into the reaction bottle. The mixture was dispersed with a high-speed homogenizer and then de-bubbled to form a solution. The solution was spin-coated on a glass substrate to form a coating. The coating was then baked at 150° C. to remove most of the solvent, and then baked at 180° C. for 3 hours to remove the residual solvent. As such, an anionic exchange film (16) was obtained to measure its ionic conductivity, size change ratio, and yield strength by the described methods, as shown in Table 3.

TABLE 3

| Anionic exchange film | Copolymer | Ionic segment ratio (%) | Crosslinking agent ratio (%) | Conductivity (S/cm) | Size change ratio (%) | Yield strength (MPa) |
|---|---|---|---|---|---|---|
| (3) | Copolymer (2) | 35 | 3 | 0.027 | 112.8 | 20.3 |
| (15) | Copolymer (10) | 40 | 5 | 0.020 | 103.2 | 11.3 |
| (16) | Copolymer (11) | 40 | 5 | 0.031 | 67.7 | 14.7 |

As shown in Table 3, when the copolymers (of different structures) included the ammonium-containing heterocyclic ring with the double bond, it could be crosslinked by the crosslinking agent to form the films.

Example 17

100 parts by weight of copolymer (2) was added into a reaction bottle and then dissolved by 567 parts by weight of DMSO. 3 parts by weight of the crosslinking agent of prepolymer type was then added into the reaction bottle. The mixture was dispersed with a high-speed homogenizer and then de-bubbled to form a solution. The solution was spin-coated on a glass substrate to form a first coating. A porous supporting material was put onto the first coating. The first coating was then baked at 150° C. to remove most of the solvent, and the solution was spin-coated onto the porous supporting material to form a second coating. The second coating was baked at 150° C. to remove most of the solvent, and then baked at 180° C. for 3 hours to remove the residual solvent. As such, an anionic exchange film (17) was obtained to measure its ionic conductivity, size change ratio, and yield strength by the described methods, as shown in Table 4.

As shown in Table 4, the porous supporting material could reduce the size change ratio and increase the yield strength of the film.

TABLE 4

| Anionic exchange film | Copolymer | Porous supporting material | Crosslinking agent ratio (%) | Conductivity (S/cm) | Size change ratio (%) | Yield strength (MPa) |
|---|---|---|---|---|---|---|
| (3) | Copolymer (2) | No | 3 | 0.027 | 112.8 | 20.3 |
| (17) | Copolymer (2) | Yes | 3 | 0.023 | 17.0 | 30.2 |

Example 18

Different copolymers were mixed with the crosslinking agent of different ratios, and the viscosities of the mixtures were measured after different periods, as shown in Table 5.

TABLE 5

(Viscosity change of the mixture of the copolymer and the crosslinking agent after different periods)

| Copolymer | Ionic segment ratio (%) | Crosslinking agent ratio (%) | Period (hr) | Viscosity (cp) |
|---|---|---|---|---|
| Copolymer (2) | 35 | 0 | — | 528.0 |
| Copolymer (2) | 35 | 3 | 0.5 | 588.3 |
| Copolymer (2) | 35 | 3 | 2.0 | 614.7 |
| Copolymer (2) | 35 | 3 | 24.0 | 683.1 |
| Copolymer (3) | 60 | 0 | — | 208.6 |
| Copolymer (3) | 60 | 10 | 0.5 | 257.9 |
| Copolymer (3) | 60 | 10 | 2.0 | 418.6 |
| Copolymer (3) | 60 | 10 | 24 | 943.8 |
| Copolymer (3) | 60 | 13 | 2.0 | 675.4 |
| Copolymer (3) | 60 | 13 | 24 | 2175 |
| Copolymer (5) | 80 | 0 | — | 208.6 |
| Copolymer (5) | 80 | 10 | 0.5 | 3814 |
| Copolymer (7) | 35 | 0 | — | 208.6 |
| Copolymer (7) | 35 | 3 | 0.5 | 132.0 |
| Copolymer (7) | 35 | 3 | 2.0 | 136.4 |
| Copolymer (7) | 35 | 3 | 24.0 | 140.1 |

Different ionic segment ratios need the crosslinking agent of different ratios. The crosslinking agent would increase the viscosity of the crosslinked copolymer with the higher ionic segment ratio. The same copolymer (with the same ionic segment ratio) should have a higher viscosity after being crosslinked by the crosslinking agent of a higher ratio. The viscosity of the copolymer (7) was not increased by the crosslinking agent, which could not form a film. The preferred viscosity of the mixture was 200 to 3000 cps.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A crosslinked copolymer, comprising:
    a copolymer crosslinked by a crosslinking agent,
    wherein the copolymer is copolymerized of (a) styrene-based monomer, (b) monomer having conjugated double bonds or acrylate ester monomer, and (c) ammonium-containing heterocyclic monomer,
    wherein the crosslinking agent is (d)

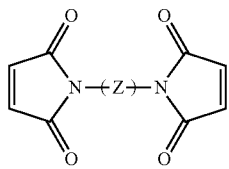

or a product of the reaction between (d)

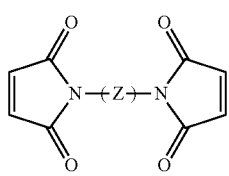

and (e)

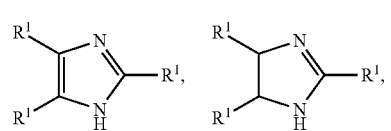

or a combination thereof, wherein Z is

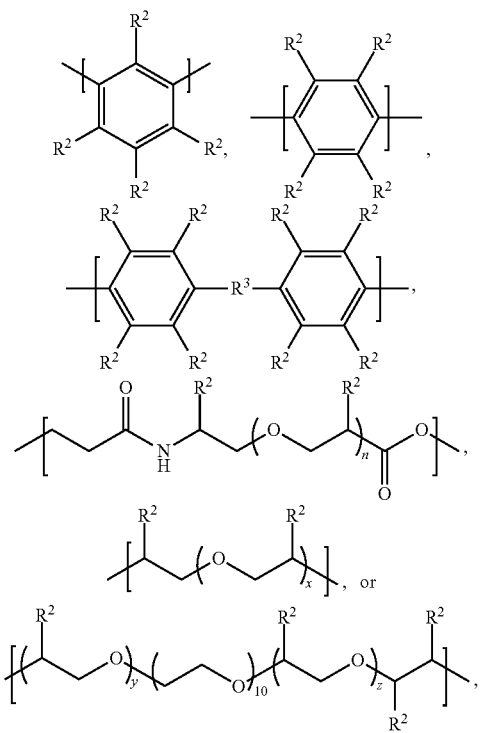

wherein each $R^1$ is independently H or $C_{1-4}$ alkyl group,
each $R^2$ is independently H or $C_{1-4}$ alkyl group,
$R^3$ is single bond, —O—, —S—, —CH$_2$—, or —NH—,
n is a positive integer,
x is 1 to 12,
y is 1 to 5, and
z is 1 to 5.

2. The crosslinked copolymer as claimed in claim 1, wherein the copolymer and the crosslinking agent have a weight ratio of 6 to 50.

3. The crosslinked copolymer as claimed in claim 1, wherein (c) ammonium-containing heterocyclic monomer and (a) styrene-based monomer have a molar ratio of 1:10 to 50:1, and (c) ammonium-containing heterocyclic monomer and (b) monomer having conjugated double bonds or acrylate ester monomer have a molar ratio of 1:10 to 50:1.

4. The crosslinked copolymer as claimed in claim 1, wherein the copolymer has a weight average molecular weight of 5000 to 300000.

5. The crosslinked copolymer as claimed in claim 1, wherein (a) styrene-based monomer has a chemical structure of

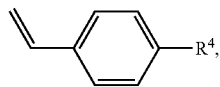

wherein $R^4$ is H, $C_{1-10}$ alkyl group, or $C_{5-6}$ cycloalkyl group.

6. The crosslinked copolymer as claimed in claim 1, wherein (b) monomer having conjugated double bonds has a chemical structure of

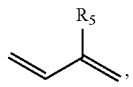

and (b) acrylate ester monomer has a chemical structure of

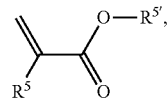

wherein each $R^5$ is independently H, $C_{1-10}$ alkyl group, or $C_{5-6}$ cycloalkyl group, and
$R^{5'}$ is independently H, $C_{1-8}$ alkyl group, polyalkylene glycol group, or hydroxyl-containing alkyl group.

7. The crosslinked copolymer as claimed in claim 1, wherein (c) ammonium-containing heterocyclic monomer has a chemical structure of

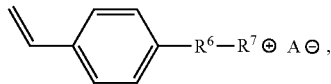

wherein $R^6$ is single bond, or linear or branched $C_{1-10}$ alkylene group,

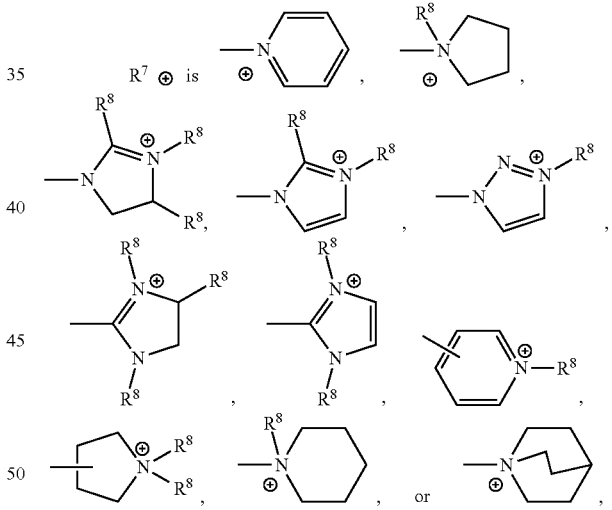

wherein each of $R^8$ is independent H, $C_{1-8}$ alkyl group, ethenyl group, $C_{6-12}$ aromatic group, or allyl group, and
wherein $A^-$ is $F^-$, $Cl^-$, $Br^-$, $I^-$, $OH^-$, $HCO_3^-$, $HSO_4^-$, $NH_2^-$, $SbF_6^-$, $BF_4^-$, $H_2PO_4^-$, $HPO_3^-$, or a combination thereof.

8. An ionic exchange film, comprising a film of the crosslinked copolymer as claimed in claim 1, and the film of the crosslinked copolymer has a thickness of 15 micrometers to 200 micrometers.

9. The ionic exchange film as claimed in claim 8, further comprising a porous supporting film adhered to the film of the crosslinked copolymer, and the film of the crosslinked copolymer filled into pores of the porous supporting film.

10. The ionic exchange film as claimed in claim 9, wherein the porous supporting film comprises polytetrafluoroethylene, polyimide, polyethylene terephthalate, polyether ether ketone, polypropylene, polyethylene, polyvinylidene fluoride, a blend thereof, or a multi-layered structure thereof.

* * * * *